F. ASSMANN.
DOOR LOCK.
APPLICATION FILED NOV. 28, 1908.

943,133.

Patented Dec. 14, 1909.

Friedrich Assmann

UNITED STATES PATENT OFFICE.

FRIEDRICH ASSMANN, OF LEICHLINGEN, GERMANY.

DOOR-LOCK.

943,133.  Specification of Letters Patent.  Patented Dec. 14, 1909.

Application filed November 28, 1908.  Serial No. 464,838.

*To all whom it may concern:*

Be it known that I, FRIEDRICH ASSMANN, a citizen of the German Empire, residing at Leichlingen, Rhenish Prussia, Germany, have invented new and useful Improvements in Door-Locks, of which the following is a specification.

This invention relates to improvements in latch mechanism for door locks of the class where the lock is inserted in a mortise, and the object of my invention is to provide a lock where the latch mechanism is so constructed that the latch may, without the aid of a key, be so adjusted that the latch-bolt becomes arrested, so that the door can not be opened from the outside.

Figure 1:
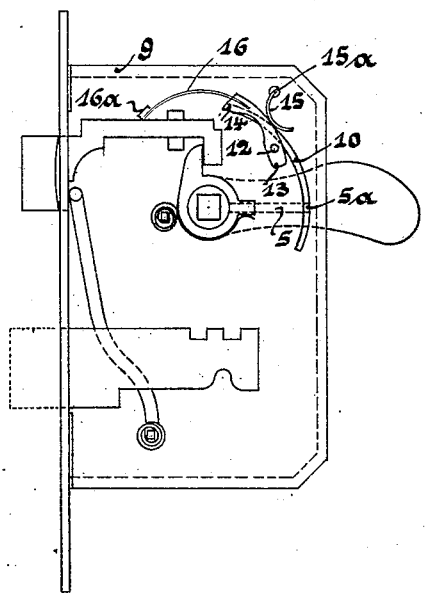
Figure 2:
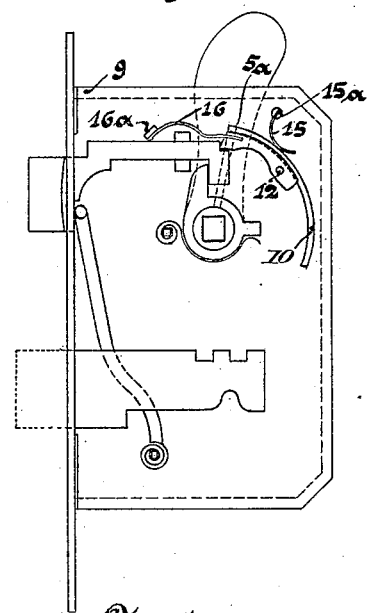
Figure 6:
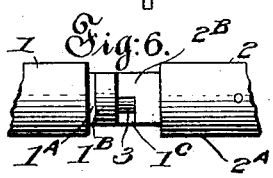
Figure 7:
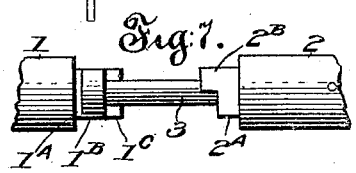
Figure 8:
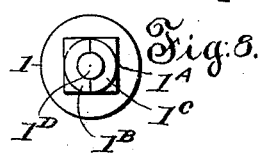
Figure 9:
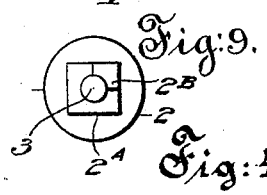
Figure 3:
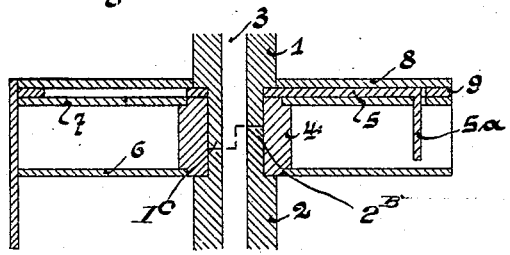
Figure 4:
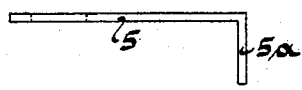
Figure 5:
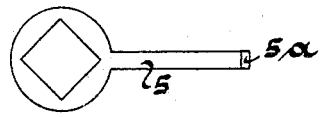

In the drawing herewith, Figure 1 shows a lock from which one of the cover-plates has been removed and in which my improved latch mechanism has been employed, the safety device hereinbelow referred to being disengaged so that the door may be opened from the inside or outside. Fig. 2 corresponds with Fig. 1, except that it shows the latch-bolt engaged by the safety-device. Fig. 3 is a transverse section through the latch mechanism on the level which goes through the middle of the rollback of the door-handle. Fig. 4 is a side view of the lever hereinbelow referred to as effectuating the engagement of the latch-bolt by the safety-device. Fig. 5 is a plan view of the said lever. Fig. 6 is a side view of the axle with the lock removed, illustrating the clutch between the two axle parts. Fig. 7 is a similar view illustrating the parts separated. Fig. 8 is an inner end view of the axle part attached to the in-door handle; and Fig. 9 a similar view of the corresponding part attached to the out-door handle.

The axle of the door-handle is composed of two parts 1 and 2, which are kept together by a pin 3, rigidly secured in part 2, while it permits turning of the part 1. These parts 1 and 2 meet in a clutch coupling situated within the roll-back 4. This clutch permits either door-handle, when in normal—that is, horizontal position—to be turned downward and to retract the latch. The inner handle, attached to part 1 of the axle, will, when turned upward and placed in upright position, cause the safety device to engage the latch and thereby lock the same against movement by the outside handle 2.

The clutch mechanism is illustrated in Figs. 6, 7, 8, and 9. The indoor handle attached to axle 1 has a central rounded bore $1^D$ for receiving the stem 3, about which it freely turns. The squared shoulder $1^A$ on axle 1 passes within and fits the squared inner end of the safety-lever 5. The clutch proper is composed of the rounded inner end $1^B$ of axle part 1, the inner end of which is half cut away, leaving the semi-circular stub $1^C$. The other or out-door axle part 2 terminates at its inner end in the reduced squared shoulder $2^A$, which, at its inner extremity is three-quarters cut away, leaving a stub $2^B$ of one-quarter the original dimensions of $2^A$, and which fits into cut-away part of $1^B$, passing stub $1^C$. It will be observed that this clutch construction gives the indoor member 1, a movement of one-quarter of a circle, without movement of 2, the only effect of this movement being to move the lever 5.

The action of the lock is explained as follows: In normal position, that is, when the door-handles are in horizontal position, the clutch connection of the two axle parts 1 and 2 engages each with the other, so that when the door-handle on either side is turned down, the latch-bolt is retracted; but when the door-handle on the inside is turned upright, the latch-bolt is not operated because the clutch permits the axle part 1, which is, as aforesaid, mounted loosely around the pin 3, to have one-quarter turn without moving axle part 2. The portion 1 of the axle which is in the roll-back is round, while the portion by which it engages the safety-device—that is, the safety-lever 5—is square so that the axle, when the door-handle is being turned, may loosely move within the roll-back, taking, however, the safety-lever 5 along. The safety-lever 5 is a radial piece perpendicular to and rigidly connected with the portion 1 of the axle to which the indoor handle is secured and is between the intermediate plate 7 and the cover-plate 8, which is connected with the plate 7 by means of distance-piece 9, and rivets. The safety-lever 5 is mounted upon the square portion $1^A$ of the said axle part 1, the bent end thereof $5^a$, traveling in the guide-groove 10 in the said plate 7, and passing by a cam lever 13. This lever 13 has a detent-shaped end 14 and turns on a pivot 12, acting on the back of the said cam lever 13, the said detent portion 14 being thereby caused to engage the tail-piece of the latch-bolt. The lever 13 is maintained in position normally out of contact with the bolt by spring 16, connected with the cover-plate by means of a pin 16ª, which spring 16 returns the cam-lever 13 when the safety-lever 5 disengages it. An arched spring 15 mounted in pivot 15^A in one of the cover-plates of the lock presses upon the lever 13, counter to spring 16, and maintains it in proper position to be acted on by the safety-lever 5. Spring 15 may be weaker than spring 16, although the relative distances from the pivot of the pawl will permit the spring 16 to press back spring 15. The spring 16 might be dispensed with by causing spring 15 to engage the tail of the pawl so as to maintain the pawl normally in the position of Fig. 1. Now, when either door-handle is turned downward, the roll-back, owing to its connection with the square part of the portion 2 of the axle and to the clutch coupling, makes a rotary movement which retracts the latch. When the door-handle on the inside of the room is placed upright, the safety-lever 5, with its turned end 5ª, travels in the slot 10 and forces the cam-lever 13 downward, causing its detent-end 14 to pass into the path of and engage the tail-piece of the latch bolt, so that an operation of the handle from the outside of the room becomes impossible.

It may be remarked that when a lock of this kind is employed, the locking bolt need not be used, because the door is perfectly secured by the latch-bolt.

What I claim is:

1. In a door lock, a latch, a latch retracting roll back, an outer handle adapted to operate the roll back, an inner handle, a loose connection therefrom to the roll back whereby the said handle is adapted to operate the roll back when turned in one direction, a latch arrester comprising the combination of lever, 5, having a bent end 5ª, and a cam-lever 13, within the action of said bent end and having a detent end adapted to engage the tail-piece of the latch where the same is thrown forward, and a connection from said latch arrester to the inner handle operated by a movement of said inner handle in a direction opposite to the latch retracting movement whereby the latch is located in its forward position against movement by the outer handle, substantially as described.

2. In a door-lock, a latch-bolt arrester comprising the combination of door-handles, the axle of which is composed of two portions connected with each other by a clutch coupling, the door-handle on the indoor portion being movable upwardly, a lever 5, radiating from and rigidly connected with the said indoor portion of the said axle and having a bent end 5ª, a cam-lever within the action of the said bent end and having a detent-end adapted to engage the tail-piece of the latch-bolt, substantially as described.

3. In a door-lock, a latch-bolt arrester comprising the combination of a latch mechanism, a lever 5, having a bent end 5ª, guided in a curved slot, a cam-lever 13 within the action of the said bent end and having a detent-end adapted to engage the tail-piece of the latch-bolt, and a spring 16 secured in one of the cover-plates of the lock and adapted to act on the detent end of the cam lever when the handle is in horizontal position.

4. In a door-lock, a latch-bolt arrester comprising the combination of a latch mechanism, an intermediate plate, a lever 5, having a bent-end 5ª, guided in a curved slot in said intermediate plate, a cam-lever 13 within the action of said bent-end when traveling in the said slot, and having a detent-like end adapted to engage the tail-piece of the latch-bolt, and a spring 16 engaging said cam-lever and withdrawing the same from said tail-piece upon the withdrawal of the said detent-like end.

5. In a door-lock, a latch, a device for withdrawing same, a two-part axle, a controlling connection between one of said parts and said latch-withdrawing device, a clutch between the two parts of said axle adapted to permit the other part of the axle to operate the latch when moved in one direction and to have a limited free movement in the opposite direction, and a stop for the latch, and means for inserting the same in the path of the latch operated by the other part of the axle in the said limited free movement.

6. In a door-lock, a latch, an axle for operating same having outer and inner members, a latch-retracting device attached to the outer member, a clutch connecting the outer and inner members operating to cause both said members to turn together in one direction and to allow the inner member to move free in the opposite direction, a stop for the latch and means for setting same operated by the said free movement of the inner axle member, substantially as described.

7. In a door-lock, a latch, a two-part hollow axle for operating same having an inner and outer member, a spindle secured to the outer member and projecting through the inner member, a latch-retracting device connected to the outer member, a clutch connecting said inner and outer members comprising stubs attached to the inner ends of each of said members, which pass by each other, a lever attached to and turning with the inner member, a latch-stop actuated by said lever, the said parts so combined and operating that a movement of either of said axle members in one direction will retract the latch, and a movement of the inner member in the other direction will set said latch-stop.

8. In a door-lock, a latch, a two-part axle having inner and outer members, a latch-retracting device connected to the outer member, a latch-stop and a latch-stop operating-lever connected to the inner member, and a clutch connecting said inner and outer members, permitting said inner member a limited movement free of said outer member.

9. In a door-lock, a latch, a roll-back, a two-part axle having an inner and an outer member, one of said members being mounted in said rollback so as to turn therewith, and the other member being mounted in said rollback so as to turn freely therein, a clutch connection between said two members, permitting said member mounted to turn freely in said rollback to have a limited turning movement free of the other axle member, a latch-stop, and a lever attached to said freely-moving axle member, operating to set said stop in the path of the latch, upon the limited free movement of said axle member, the said parts so combined and operating that a movement of either of said axle members in one direction will retract the latch, and a movement of the freely-moving axle member in the other direction will lock the latch against movement by the other axle member.

10. In a door-lock, a roll-back, a two-part axle having an inner and outer member, a connection between said roll-back and outer member, whereby they turn together, a clutch connection between said inner and outer members, comprising projecting and engaging stubs, the said inner member being mounted in said roll-back so as to move freely therein, a latch-stop, and a latch-stop operating-lever fixed to turn with said inner member.

11. In a door-lock, latch mechanism, a two-part axle, a latch-stop, a connection between said stop and one of the parts of the axle for setting the stop, actuated by a movement of the said axle part in one direction, a connection from the opposite part of the axle to the latch mechanism, and a clutch connecting the two parts of said axle whereby a movement of either part of the axle in the other direction will retract the latch.

12. In a door-lock, a latch, a retaining pawl normally spring-pressed out of the path of said latch, a two-part axle, handles attached thereto, a clutch connecting said parts, a roll-back operated by a movement of either handle in one direction, a connection between one of the parts of the axle and the pawl operated by a movement of the corresponding handle in the opposite direction, whereby the latch is locked against movement by the opposite handle.

13. In a door lock having outer and inner handles, a latch, a roll back, a fast connection between one of said handles and the roll back whereby the latch is retracted and a loose connection between the other handle and the roll back, whereby the latch is retracted when said handle is moved in one direction, a stop for said latch, operating means between said stop and the last mentioned handle, operated by a movement of said handle in a direction opposite to the latch retracting movement, whereby, when the said handle is moved in said opposite direction the latch is locked against movement by the first mentioned handle, substantially as described.

14. In a door lock having outer and inner handles, a latch, an axle split vertically, and a latch-retracting roll-back operatively connected to the outer part of said axle, a clutch connecting the split ends of the axle, permitting the inner part of the axle to move the outer part when turned one way, and to move freely when turned the other way, a latch-bolt-arrester and a connection thereto from the inner handle whereby the said handle will set said latch-bolt-arrester when turned free of the opposite handle.

15. In a door lock, a two-part hollow axle, a spindle secured to the outer member and passing freely through the inner member (allowing said inner member freely to turn thereon), a clutch connection between said outer and inner members comprising an axial projection $2^B$ on the outer member, and an axial projection $1^C$ on the inner member, said projection overlapping each other and permitting the inner member one quarter of a revolution free of the outer member.

In testimony whereof I have signed my name to this specification in the presence of two subscribing witnesses.

FRIEDRICH ASSMANN. [L. S.]

Witnesses:
 Otto König,
 Wm. Washington Brunswick.